(12) United States Patent
Harada (10) Patent No.: US 11,346,442 B2
(45) Date of Patent: May 31, 2022

(54) SHIFT OPERATION DETERMINATION APPARATUS AND SHIFT APPARATUS

(71) Applicant: HONDA MOTOR CO., LTD., Tokyo (JP)

(72) Inventor: Kenichi Harada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/197,952

(22) Filed: Mar. 10, 2021

(65) Prior Publication Data
US 2021/0293332 A1 Sep. 23, 2021

(30) Foreign Application Priority Data
Mar. 19, 2020 (JP) .............................. JP2020-048636

(51) Int. Cl.
| | | |
|---|---|---|
| *F16H 61/18* | (2006.01) | |
| *F16H 61/16* | (2006.01) | |
| *F16H 59/08* | (2006.01) | |
| *F16H 59/48* | (2006.01) | |
| *F16H 61/22* | (2006.01) | |
| *F16H 59/54* | (2006.01) | |

(52) U.S. Cl.
CPC .............. *F16H 61/16* (2013.01); *F16H 59/08* (2013.01); *F16H 59/48* (2013.01); *F16H 59/54* (2013.01); *F16H 61/18* (2013.01); *F16H 61/22* (2013.01); *F16H 2059/081* (2013.01)

(58) Field of Classification Search
CPC .......... F16H 59/08; F16H 59/48; F16H 59/54; F16H 2059/081; F16H 61/16; F16H 61/18; F16H 61/22; F16H 2061/161
See application file for complete search history.

(56) References Cited

U.S. PATENT DOCUMENTS

| | | | | |
|---|---|---|---|---|
| 4,966,262 A | * | 10/1990 | Mieczkowski | ......... F16H 59/10 192/220.2 |
| 5,573,475 A | * | 11/1996 | Sakakiyama | ......... F16H 59/105 477/96 |
| 2006/0100059 A1 | * | 5/2006 | Nonaka | .................... G05G 5/06 477/121 |

FOREIGN PATENT DOCUMENTS

JP 2013-47074 A 3/2013

* cited by examiner

*Primary Examiner* — Edwin A Young
(74) *Attorney, Agent, or Firm* — Rankin, Hill & Clark LLP (57) ABSTRACT

A shift operation determination apparatus includes: an operation member rotatably attached to the vehicle; an operation detection section configured to detect a position of the operation member; a lock mechanism configured to regulate a rotation of the operation member; a braking operation detection section configured to detect a braking operation of the vehicle; a shift determination section configured to determine any one of a plurality of shift ranges including a first range for parking and a second range different from the first range, based on the position of the operation member; and a lock control section configured to cause the lock mechanism to regulate the rotation of the operation member from a first position corresponding to the first range to a second position corresponding to the second range when the braking operation is not detected.

7 Claims, 8 Drawing Sheets

SHIFT OPERATION DETERMINATION APPARATUS AND SHIFT APPARATUS

INCORPORATION BY REFERENCE

The present application claims priority under 35 U.S.C. § 119 to Japanese Patent Application No. 2020-048636 filed on Mar. 19, 2020. The content of the application is incorporated herein by reference in its entirety.

BACKGROUND OF THE INVENTION

Field of the Invention

The present invention relates to a shift operation determination apparatus and a shift apparatus.

Description of the Related Art

In the related art, as a shift apparatus of a vehicle, a lever-shaped shift apparatus using a shift lever and a dial-shaped shift apparatus using a shift knob have been known. Such a shift apparatus has a P (parking) range selected during parking of the vehicle, and a plurality of shift ranges including an R (reverse), an N (neutral), and a D (drive), and a driver selects the shift range by operating the shift lever and the shift knob. Specifically, the respective shift ranges of P, R, N, D, and S are arranged side by side in the operation range of the operation member such as the shift lever or the shift knob, and the shift range is selected corresponding to a position of the operation member according to the operation of moving the operation member.

In such a shift apparatus, a condition may be provided for the operation of switching from the P range to another shift range so that the vehicle cannot move against the intention of the driver. For example, Japanese Patent Laid-Open No. 2013-47074 discloses an example in which a brake pedal is depressed when the dial-shaped shift operation member is rotated from the P range in the shift apparatus.

As disclosed in Japanese Patent Laid-Open No. 2013-47074, when there is a condition for the operation of switching from the P range to another shift range, if the driver mistakenly select the P range, an operation satisfying the condition is required. For example, a case is assumed in which when the driver moves the shift operation member with the intention of switching the shift range to the R range, the shift operation member unintentionally moves to the position of the P range. In such a case, the driver should operate the brake pedal and the like so as to satisfy the condition, and feels like being forced to perform complicated operations, which may cause a psychological burden.

The present invention is to reduce a burden on the driver when the driver unintentionally selects the shift range for parking in the operation of switching the shift range of the vehicle.

SUMMARY OF THE INVENTION

An aspect of the present invention is to provide a shift operation determination apparatus including: an operation member rotatably attached to the vehicle; an operation detection section configured to detect a position of the operation member in a rotation direction; a lock mechanism configured to regulate a rotation of the operation member; a braking operation detection section configured to detect a braking operation of the vehicle; a shift determination section configured to determine any one of a plurality of shift ranges including a first range for parking and a second range different from the first range, based on the position of the operation member; and a lock control section configured to cause the lock mechanism to regulate the rotation of the operation member from a first position corresponding to the first range to a second position corresponding to the second range when the braking operation is not detected, wherein the lock control section is capable of releasing a regulation of the rotation of the operation member from the first position to the second position within a predetermined time after the operation member rotates from the second position to the first position.

In another aspect of the present invention the lock control section releases the regulation of the rotation of the operation member when the braking operation is detected, within the predetermined time after the operation member rotates from the second position to the first position.

In another aspect of the present invention, the lock control section causes the lock mechanism to regulate the rotation of the operation member when the operation member moves to the second position side of the first position in an absence of the braking operation, and the lock control section releases the regulation of the rotation of the operation member when the braking operation is detected in the state where the operation member moves to the second position side of the first position, within the predetermined time after the operation member rotates from the second position to the first position.

In another aspect of the present invention, the lock control section releases the regulation by the lock mechanism on condition that both the release of the operation of rotating the operation member and the braking operation are performed, when the rotation of the operation member is regulated by the lock mechanism due to movement of the operation member to the second position side of the first position in the absence of the braking operation, and the lock control section releases the regulation of the rotation of the operation member when the braking operation is detected in the state where the operation member moves to the second position side of the first position, within the predetermined time after the operation member rotates from the second position to the first position.

In another aspect of the present invention, the shift operation determination apparatus further includes an acceleration operation detection section configured to detect an operation on an accelerator operation section of the vehicle, wherein the lock control section causes the lock mechanism to regulate the rotation of the operation member until the operation on the accelerator operation section is released when the operation is performed on the accelerator operation section for the predetermined time after the operation member rotates from the second position to the first position.

In another aspect of the present invention, the shift operation determination apparatus further includes an obstacle detection section configured to detect an obstacle around the vehicle, wherein the lock control section causes the lock mechanism to regulate the rotation of the operation member while the obstacle is detected by the obstacle detection section for the predetermined time after the operation member rotates from the second position to the first position.

Another aspect of the present invention is to provide a shift apparatus including: a shift operation determination apparatus configured to determine a shift range of a vehicle according to an operation; and a shift control section configured to switch the shift range of the vehicle based on a determination result of the shift operation determination apparatus, the shift operation determination apparatus including: an operation member rotatably attached to the vehicle; an operation detection section configured to detect a position of the operation member in a rotation direction; a lock mechanism configured to regulate a rotation of the operation member; a braking operation detection section configured to detect a braking operation of the vehicle; a shift determination section configured to determine any one of a plurality of shift ranges including a first range for parking and a second range different from the first range, based on the position of the operation member; and a lock control section configured to cause the lock mechanism to regulate the rotation of the operation member from a first position corresponding to the first range to a second position corresponding to the second range when the braking operation is not detected, the lock control section being capable of releasing a regulation of the rotation of the operation member from the first position to the second position within a predetermined time after the operation member rotates from the second position to the first position.

According to the aspects of the present invention, it is possible to release a regulation of an operation of switching a shift range for parking to another shift range within a predetermined time after the shift range for parking is selected. Therefore, the burden of the operation of changing the shift range can be reduced, and the operability of a driver can be improved. For example, when the driver unintentionally selects the shift range for parking, it is possible to easily switch to the originally intended shift range.

DETAILED DESCRIPTION OF THE PREFERRED EMBODIMENT

An embodiment according to the present invention will be described below with reference to the drawings.

1. Overview of Gear Shift of Automobile

Figure 1:
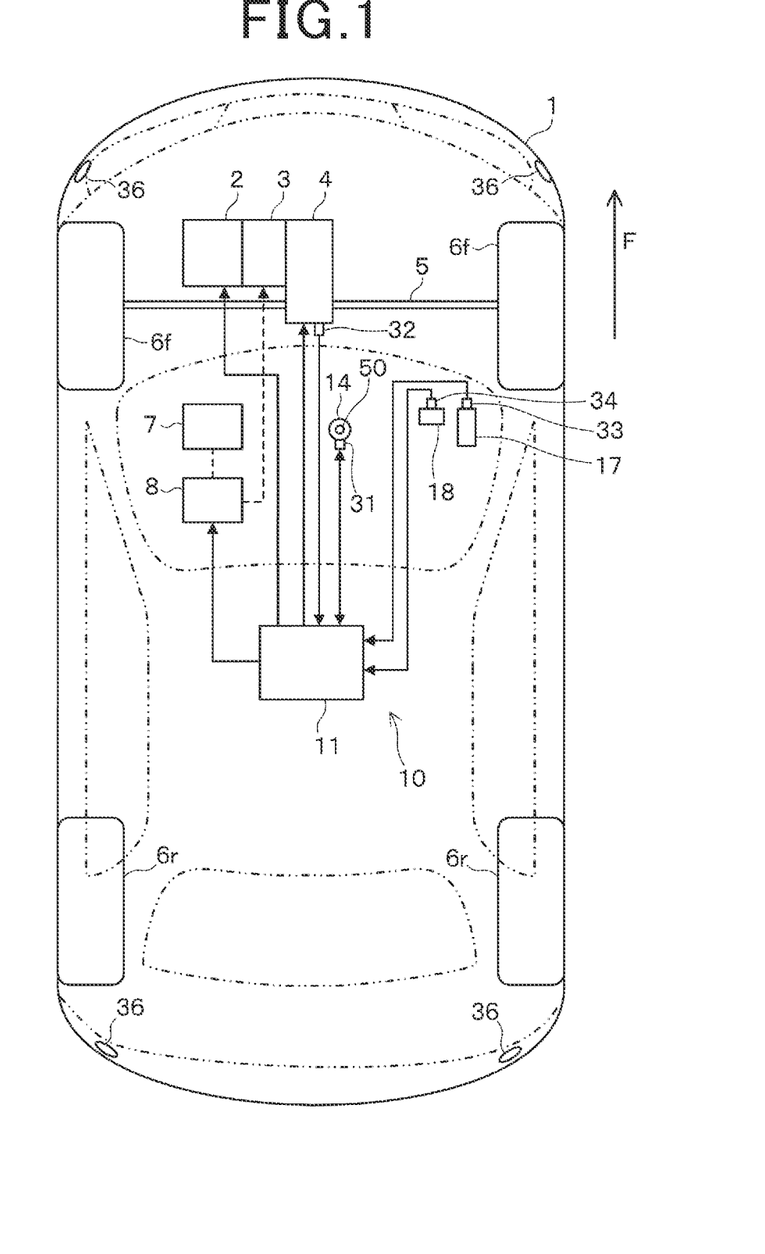
FIG. 1 is a schematic diagram of a drive system of an automobile according to the present embodiment.
Figure 2:
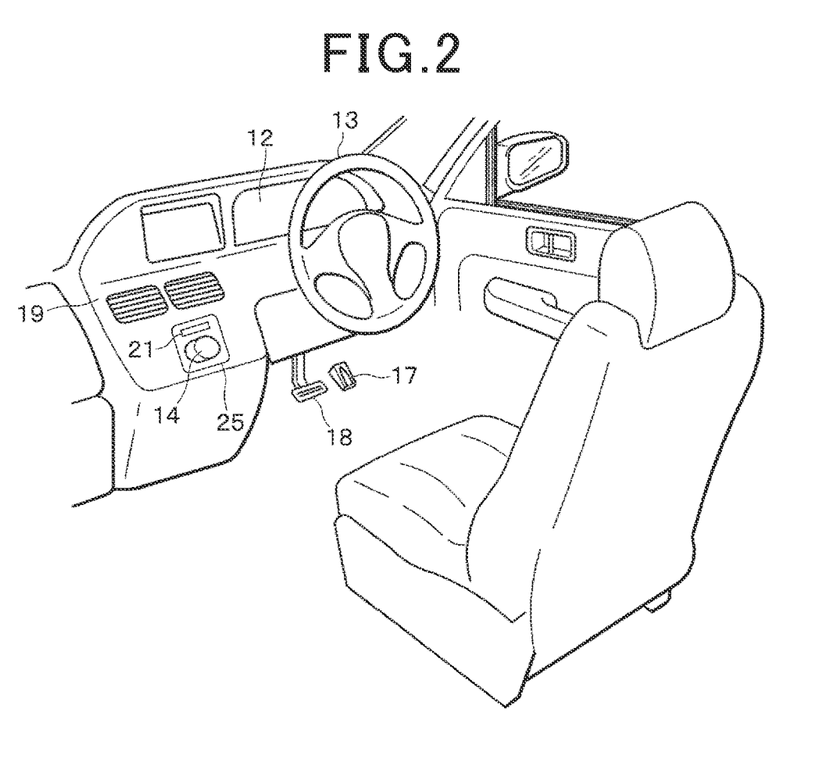
FIG. 2 is a schematic perspective view of a periphery of a driver's seat of the automobile.

FIG. 1 is a schematic diagram of a drive system of an automobile 1 according to an embodiment to which the present invention is applied. FIG. 2 is a schematic perspective view of a periphery of a driver's seat of the automobile 1.

The automobile 1 described in the present embodiment is mounted with an engine 2 as a drive source, and transmits power of the engine 2 to drive wheels through a transmission 4 and a drive shaft 5. In the illustrated example, the automobile 1 is a front-wheel drive vehicle having front wheels 6f as drive wheels, but may be a rear-wheel drive vehicle having rear wheels 6r as drive wheels or a four-wheel drive vehicle having both front and rear wheels 6 as drive wheels. In FIG. 1, reference numeral F indicates a traveling direction when the automobile 1 moves forward.

The transmission 4 mounted on the automobile 1 is an automatic transmission (AT) that automatically shifts gears under control of a control unit 11 to be described below. In the present embodiment, as an example of the transmission 4, a step AT with four forward gears and one reverse gear is described. However, the transmission 4 may be a more multi-gear AT or a continuously variable transmission (CVT). Further, a mechanical configuration of the transmission 4 may be a configuration having a torque converter or a DCT (dual clutch transmission) without being limited.

The automobile 1 may be an electric automobile (EV) in which a motor generator 3 is mounted instead of the engine 2 as a drive source. In addition, the automobile 1 may be a hybrid vehicle (HEV) in which the motor generator 3 is mounted together with the engine 2 as the drive source. The motor generator 3 may function not only as an electric motor for vehicle driving but also as a regenerative generator. An inverter 8 functions as a regenerative braking means of controlling an electric power supply from a battery 7, which is a secondary battery, and an electric power supply (charging) to the battery 7, and converting and regenerating deceleration energy into electric power during deceleration to generate regenerative braking. The automobile 1 may be mounted with a plurality of motor generators 3. For example, the automobile 1 may be provided with a first motor generator 3 that functions as a starter motor used to start the engine 2 and a generator used to generate electricity by the power of the engine 2 and a second motor generator 3 for vehicle driving.

The automobile 1 includes a control unit 11 configured to control the drive system of the automobile 1. The control unit 11 includes, for example, a processor such as a microcomputer, a ROM (Read Only Memory), a RAM (Random Access Memory), peripheral circuits, input/output interfaces, and various drivers.

The automobile 1 includes an accelerator pedal 17 as an accelerator operation unit configured to accelerate the automobile 1 and a brake pedal 18 as a braking operation unit configured to decelerate the automobile 1. The control unit 11 is connected to a vehicle speed sensor 32 configured to detect a vehicle speed of the automobile 1, an accelerator pedal sensor 33 configured to detect the amount of operation of the accelerator pedal 17, and a brake pedal sensor 34 configured to detect an operation of the brake pedal 18.

The automobile 1 may have a configuration in which the accelerator pedal 17 is mechanically coupled to a throttle apparatus of the engine 2, and may be a vehicle that adopts a so-called drive-by-wire in which the control unit 11 controls the throttle apparatus based on the detection result of the accelerator pedal sensor 33. Further, the automobile 1 may have a configuration in which the brake pedal 18 is mechanically coupled to a braking mechanism of the automobile 1, and may be a vehicle that adopts a so-called brake-by-wire in which the control unit 11 controls the braking mechanism based on the detection result of the brake pedal sensor 34. Further, an accelerator operation unit having a lever shape or another shape may be adopted instead of the accelerator pedal 17, and a brake operation unit may be adopted instead of the brake pedal 18.

The automobile 1 includes a shift apparatus 10 including the control unit 11 as a configuration for controlling the gear shift of the transmission 4. The shift apparatus 10 includes, in addition to the control unit 11, a shift operation member 14 configured to change a shift range of the transmission 4 and an angle detector (angle detection sensor) configured to detect an operation of the shift operation member 14. In addition, the shift apparatus 10 included an electromagnetic brake mechanism 50 configured to restrict the operation of the shift operation member 14. The shift apparatus 10 may include the vehicle speed sensor 32, the accelerator pedal sensor 33, and the brake pedal sensor 34. The shift apparatus 10 corresponds to an example of a shift operation determination apparatus.

The automobile 1 is provided with an obstacle sensor 36. The obstacle sensor 36 is a sensor configured to detect an obstacle around the automobile 1, and includes a sonar sensor configured to detect an object within a predetermined distance from a vehicle body of the automobile 1 using ultrasonic waves, for example. The obstacle sensor 36 may be an optical sensor configured to detect an obstacle using a laser beam, or a device configured to detect an obstacle based on an image captured by a camera. In the automobile 1, as shown in FIG. 1, for example, one obstacle sensor 36 is arranged at each of left and right ends of each front and rear portion of the vehicle body. The obstacle sensor 36 is connected to the control unit 11 by a control line (not shown), and outputs a detection result to the control unit 11. The shift apparatus 10 may include the obstacle sensor 36.

The control unit 11 selects a shift range of the transmission 4 according to the operation of the shift operation member 14 in addition to the drive control of the engine 2, and also performs shift control for changing a gear step of the transmission 4 according to the selected shift range. The gear step is changed by opening and closing of a shift solenoid valve (not shown) provided in a hydraulic circuit connected to the transmission 4. Further, when the automobile 1 is an electric automobile or a hybrid vehicle, the control unit 11 also controls a drive/regeneration of the motor generator 3. Further, the control unit 11 may have a function of controlling a lighting device mounted on the automobile 1 or another function of the automobile 1. A function related to the control of the transmission 4 will be described below.

The shift operation member 14 is a dial-shaped columnar knob, and an operation of rotating the shift operation member 14 is performed by the hand of the driver who drives the automobile 1. The driver can rotate the shift operation member 14 to switch a gear shift mode of the transmission 4 of the automobile 1, that is, the shift range. The shift operation member 14 corresponds to an example of an operation member.

The shift range of the automobile 1 includes a P (parking) range selected during parking of the automobile 1, an R (reverse) range used to retreat the automobile 1, an N (neutral) range which is a state where a driving force is not transmitted from the transmission 4 to the drive shaft 5, and a D (drive) range used to move forward the automobile 1. The transmission 4 may be configured to restrict the rotation of the drive shaft 5 in the P range and not to apply either of the driving force or the braking force to the drive shaft 5 in the N range. Further, the automobile 1 includes one or a plurality of forward shift ranges different from the D range. These types of shift ranges are called an S range, an L range, a D2 range, and a B range, and the transmission 4 of the present embodiment includes an S range as an example. In such a shift range, a deceleration ratio of the drive shaft 5 to the drive shaft of the engine 2 or the motor generator 3 is larger than that in D range. For example, such a shift range is selected for the purpose of giving a drive torque larger than that in the D range to the drive shaft 5 or for the purpose of generating a braking force stronger than that in the D range on the drive shaft 5 by engine braking or regeneration.

The shift operation member 14 is provided on a lower left side of a steering wheel 13 in the instrument panel 19 of the automobile 1. In the instrument panel 19, a portion provided with the shift operation member 14 may protrude as compared with other portions such that the driver can easily operate the shift operation member 14. A position of the shift operation member 14 is not limited to the example of FIG. 2, and may be provided at a center console or at another position.

The shift operation member 14 is unitized together with a display panel 21 configured to display the shift range selected in the automobile 1 to form an operation unit 25.

2. Configuration of Operation Unit

Figure 3:
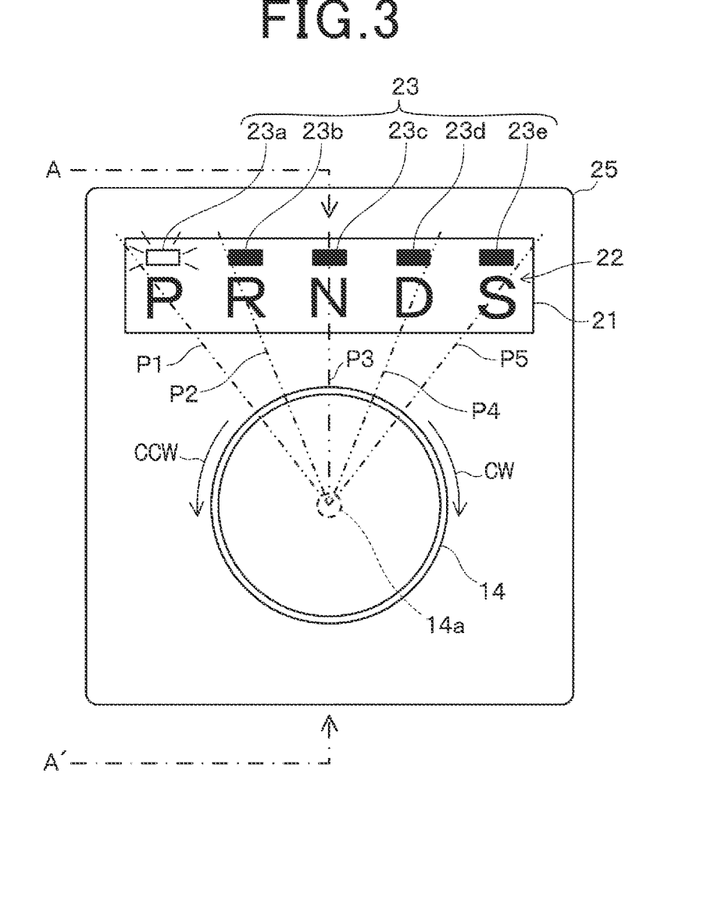
FIG. 3 is a plan view of an operation unit.

FIG. 3 is a plan view of the operation unit 25.

As shown in FIG. 3, the shift operation member 14 can rotate in a clockwise direction (CW in the drawing) and a counterclockwise direction (CCW in the drawing). In the operation unit 25, the display panel 21 is arranged above the shift operation member 14. On the display panel 21, displays of P, R, N, D, and S, which are the shift ranges of the transmission 4, are sequentially arranged in this order in the CW direction which is a rotation direction of the shift operation member 14.

The driver rotates the shift operation member 14 in the CW direction or the CCW direction to select the shift range of the transmission 4.

On the display panel 21, an indicator 23 is located corresponding to the displays of P, R, N, D, and S of a range display portion 22. The indicator 23 includes indicators 23a, 23b, 23c, 23d, and 23e corresponding to the positions of P, R, N, D, and S of the range display portion 22, respectively. The indicator 23a includes a light source such as an LED, and emits light in a state where the P range is selected as the shift range of the transmission 4. Similarly, each of the indicators 23b, 23c, 23d, and 23e includes a light source such as an LED. The indicator 23b emits light in a state where the R range is selected as the shift range of the transmission 4. The indicator 23c emits light in a state where the N range is selected, the indicator 23d emits light in a state where the D range is selected, and the indicator 23e emits light in a state where the S range is selected. FIG. 3 illustrates, as an example, a state where the P range is selected and the indicator 23a is emitting light.

In the automobile 1, the meter panel 12 may have the same display as the display panel 21. For example, the meter panel 12 may be arranged with displays of P, R, N, D, and S, which are the shift ranges of the transmission 4, to emit light of the display of the selected shift range.

In the rotation direction of the shift operation member 14, selection positions P1, P2, P3, P4, and P5 are set corresponding to the number of shift ranges of the transmission 4. The shift operation member 14 can rotate infinitely in the CW direction and the CCW direction, and is configured to obtain feeling of moderation (click feeling) at a constant angle interval as will be described below. More specifically, a click feeling is obtained for each of the angles corresponding to the selection positions P1, P2, P3, P4, and P5. For example, when the shift operation member 14 is rotated in the CW direction in the state where the shift range P is selected, a click feeling can be obtained at the selection positions P2, P3, P4, and P5. Further, when the shift operation member 14 is rotated in the CCW direction in the state where the shift range S is selected, a click feeling can be obtained at the selection positions P4, P3, P3, and P2. Thus, the shift operation member 14 can be easily rotated step by step corresponding to the displays of P, R, N, D, and S of the range display portion 22, and the operability of the operation of selecting the shift range is improved.

A relative position between the shift operation member 14 and each of the selection positions P1 to P5 is not fixed. The shift operation member 14 can be rotated in the CCW direction from the selection position P1, and can be rotated in the CW direction from the selection position P5. In this case, the selected shift range is the P range or the S range, and is not changed.

FIG. 3 shows an example of the configuration, and the automobile 1 may have a configuration in which the shift range of the transmission 4 can be selected from six steps of P, R, N, D, S, and L. Further, the automobile 1 may have a configuration in which the S range or the L range is not provided. In such a case, the number of indicators 23 and the number of selection positions may be appropriately changed according to the number of shift ranges selected by the operation of the shift operation member 14. In addition, the arrangement of the shift ranges in the range display portion 22 is not limited to the example of FIG. 3. For example, the displays of the shift ranges can be arranged clockwise instead of counterclockwise, and the B range can be arranged instead of the L range.

Figure 4:
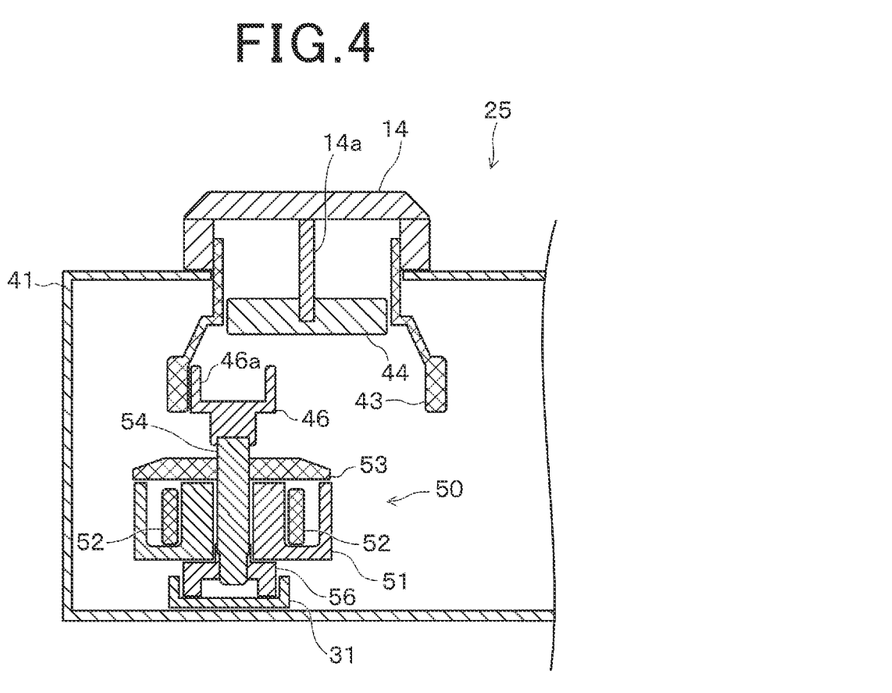
FIG. 4 is a cross-sectional view of a main portion of the operation unit.

FIG. 4 is a cross-sectional view of a main portion of the operation unit 25, and shows a main portion of the cross section A-A' in FIG. 3.

The shift operation member 14 is arranged on an upper surface of a case 41 of the operation unit 25. The case 41 houses an operation load generator 44, an overdrive mechanism 46, an electromagnetic brake mechanism 50, and an angle detector 31.

The shift operation member 14 includes a shaft 14a which is a rotating center, and the shaft 14a is supported by the operation load generator 44.

The operation load generator 44 includes, for example, cams formed at predetermined angles in the rotation direction of the shift operation member 14 and rollers that slide with the cams. The operation load generator 44 rotatably supports the shaft 14a, and generates resistance to the rotation of the shaft 14a at each angle corresponding to the cam position in the rotation direction of the shaft 14a. Thus, a click feeling is generated for the operation of rotating the shift operation member 14.

When the rotating amount of the shift operation member 14 is less than the minimum operation angle, the rollers move in a reverse direction along the cams, and thus the operation load generator 44 has an operation of returning the shift operation member 14 to the position before rotation. Therefore, when the rotating amount of the shift operation member 14 to be rotated by the driver is small, the shift operation member 14 returns to the position before rotation, so that, for example, it is possible to prevent the driver from unintentionally switching the shift range. The minimum operation angle is half of the predetermined angle, for example.

A gear 43 is fixed to the shift operation member 14. The gear 43 rotates around the shaft 14a together with the shift operation member 14.

The overdrive mechanism 46 includes a small-diameter gear 46a that engages with the gear 43, and is connected to a shaft 54. The overdrive mechanism 46 increases a rotational speed of the gear 43 with an overdrive ratio according to a ratio between the number of teeth of the gear 43 and the number of teeth of the gear 46a and transmits the rotational speed to the shaft 54.

The electromagnetic brake mechanism 50 is an example of a lock mechanism that regulates the rotation of the shift operation member 14. The electromagnetic brake mechanism 50 includes a cylindrical yoke 51, a coil 52 arranged inside the yoke 51, and an armature 53. The coil 52 is connected to the control unit 11, and a current application to the coil 52 is switched to be ON and OFF by the control of the control unit 11.

The armature 53 is coupled to a lower part of the shaft 54 and is rotatable with the shaft 54.

In a state where the current is not applied to the coil 52, the armature 53 is rotatably supported together with the shaft 54. In such a state, the armature 53 rotates as the shift operation member 14 rotates.

When the current is applied to the coil 52, the yoke 51 is magnetized, and the rotation of the armature 53 is regulated by a magnetic force of the yoke 51. Therefore, the rotation of the shaft 54 is regulated, and the rotation of the shift operation member 14 is prevented. In other words, the shift operation member 14 is locked so as not to rotate. When the current application to the coil 52 is turned off, the lock of the shift operation member 14 is released.

A to-be-detected object 56 is coupled to a lower end of the shaft 54. The to-be-detected object 56 is located inside the angle detector 31, and rotates together with the overdrive mechanism 46 and the shaft 54. The angle detector 31 is a sensor configured to detect a rotating amount of the to-be-detected object 56, and corresponds to an example of a position detection unit. The angle detector 31 outputs a detection result of the rotating amount of the to-be-detected object 56 to the control unit 11. The control unit 11 can detect a rotation angle of the shift operation member 14 by performing an arithmetic operation based on the detection result of the angle detector 31 and the overdrive ratio of the overdrive mechanism 46.

The electromagnetic brake mechanism 50 electromagnetically regulates the rotation of the armature 53. For this reason, the current flowing through the coil 52 can be adjusted, and thus a slight rotation of the armature 53 can be allowed during the current application to the coil 52. In this case, when the driver applies an operating force in the CW direction or the CCW direction to the shift operation member 14 during the current application to the coil 52, the shift operation member 14 slightly rotates due to the operating force. When such an operating force is released, the shift operation member 14 is returned to the position before rotation due to the action of the operation load generator 44.

When the operating force is applied to the shift operation member 14 during the current application to the coil 52 and when the operating force is released, the movement of the shift operation member 14 can be detected by the angle detector 31. Therefore, the control unit 11 can detect, based on the detection result of the angle detector 31, the application of the operating force to the shift operation member 14 while the rotation of the electromagnetic brake mechanism 50 is regulated and the release of the operating force. For example, the control unit 11 stops the current application to the coil 52 when detecting the release of the operating force applied to the shift operation member 14 during the current application to the coil 52.

The configuration shown in FIG. 4 is an example. For example, the operation load generator 44 may employ a known detent mechanism. Further, the angle detector 31 may be configured to magnetically detect the rotating amount of the to-be-detected object 56 rotating amount, or may be configured to detect using an optical sensor, and other detection methods may be employed. In addition, the operating force applied to the shift operation member 14 while the electromagnetic brake mechanism 50 regulates the rotation of the shift operation member 14 may be detected using, for example, a piezoelectric element, or may be detected by other sensors.

3. Configuration of Control Unit

Figure 5:
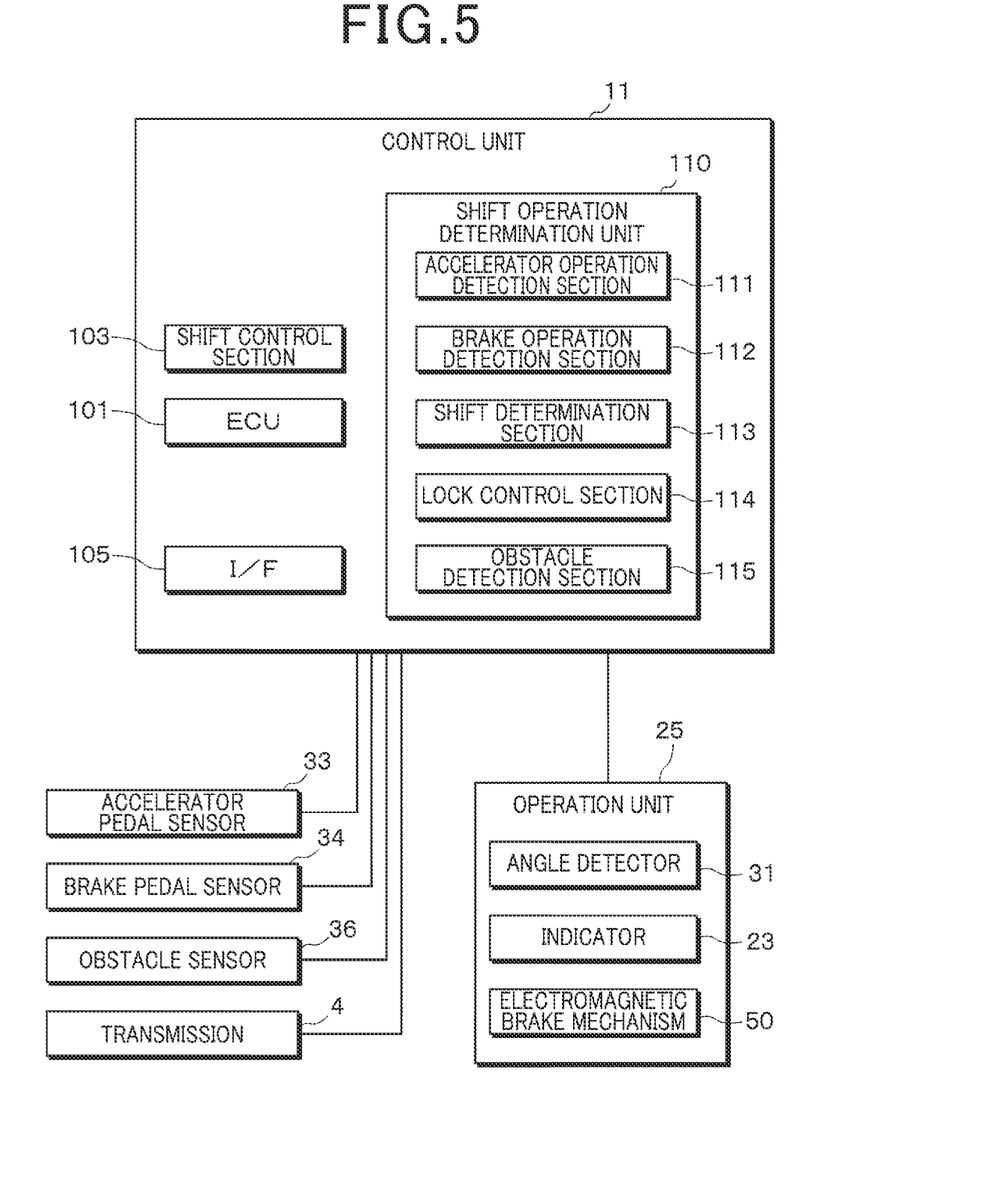
FIG. 5 is a block diagram of a control system of the automobile.

FIG. 5 is a block diagram of the control system of the automobile 1.

The control unit 11 configured to control the automobile 1 includes an ECU 101, a shift control section 103, an interface 105, and a shift operation determination unit 110. The shift operation determination unit 110 includes an accelerator operation detection section 111, a brake operation detection section 112, a shift determination section 113, a lock control section 114, and an obstacle detection section 115. Each of the functional sections in the control unit 11 may be configured by independent hardware, or the plurality of functional sections may be configured by one hardware. For example, a function of each of the sections of the shift operation determination unit 110 may be realized by execution of a program by a processor.

As described above, the ECU 101 controls, based on the detection results of the accelerator pedal sensor 33 and the brake pedal sensor 34, the engine 2 and the inverter 8 to cause the automobile 1 to travel.

The shift operation determination unit 110 detects the operations of the shift operation member 14, the accelerator pedal 17, and the brake pedal 18 to determine the shaft range of the transmission 4 corresponding to the operation of the driver.

The shift control section 103 has a control function of switching the shift range of the transmission 4. When the shift operation determination unit 110 determines the shift range according to the operation of the shift operation member 14, the shift control section 103 switches the shift range of the transmission 4 based on the determination result of the shift operation determination unit 110.

The interface 105 is a circuit configured to exchange various signals and data with an external device of the control unit 11, and is connected to the accelerator pedal sensor 33, the brake pedal sensor 34, the obstacle sensor 36, the transmission 4, and the operation unit 25. As shown in FIG. 1, the control unit 11 is connected to the engine 2 and the inverter 8, but is not shown in FIG. 5 for convenience of description.

The accelerator operation detection section 111 in the shift operation determination unit 110 detects, based on the detection result of the accelerator pedal sensor 33, the presence or absence of the operation of the accelerator pedal 17 and/or the amount of operation of the accelerator pedal 17. The accelerator operation detection section 111 corresponds to an example of an acceleration operation detection section. The brake operation detection section 112 detects, based on the detection result of the brake pedal sensor 34, the presence or absence of the operation of the brake pedal 18 and/or the amount of operation of the brake pedal 18. The brake operation detection section 112 corresponds to an example of a braking operation detection unit.

The shift determination section 113 determines, based on the detection result of the angle detector 31, which one of the selection positions P1, P2, P3, P4, and P5 the position of the shift operation member 14 corresponds to. The shift determination section 113 lights up the indicator 23 of the determined shift range.

When the shift operation member 14 moves to any one of the selection positions P1, P2, P3, P4, and P5, the shift determination section 113 determines that the shift range of the selection position of the movement destination is selected when the selection position of the movement destination is maintained for a time exceeding a threshold value (for example, 0.2 seconds). For example, when the shift operation member 14 rotates from the selection position P5 to the selection position P3, the shift determination section 113 determines that the shift range switched by the driver is the N range. The shift operation member 14 is located at the selection position P4 in the course of moving from the selection position P5 to the selection position P3. The shift determination section 113 does not determine that the D range is selected unless the time for the shift operation member 14 to maintain the selection position P4 exceeds the threshold value.

The lock control section 114 controls the regulation of the shift operation member 14 by the electromagnetic brake mechanism 50. Specifically, the lock control section 114 performs control such that the current application to the coil 52 is switched to be ON and OFF, and switches from a state where the electromagnetic brake mechanism 50 locks the shift operation member 14 to a state where the lock is released.

The obstacle detection section 115 detects obstacles located around the vehicle body of the automobile 1 based on the detection result of the obstacle sensor 36.

Among the shift range switching operations of the automobile 1, there is a restriction on the operation of changing from a certain of the shift range to another shift range. For example, in order to perform an operation of changing from the P range to the shift range other than the P range, the brake pedal 18 needs to be operated. This is a restriction for preventing for the driver from unintentional acceleration, and is a restriction generally provided in the automobile.

Also in the shift apparatus 10 of the present embodiment, the shift operation member 14 can be operated in the state where the P range is selected, on condition that the brake pedal 18 is operated in a state where the shift operation member 14 is not operated. The brake pedal 18 is not operated when the shift range is the P range, and the lock control section 114 locks the shift operation member 14 when the shift operation member 14 rotates in the CW direction. Thus, the switching form the P range to the R range or the N range is prevented.

Such a restriction is surely implemented when the transmission 4 is in the P range regardless of the driver's intention. For example, the same applies when the driver mistakenly sets the shift operation member 14 to the selection position P1 by rotating the shift operation member 14 in the CCW direction in order to switch from the D range to the N range or the R range.

When the shift operation member 14 is locked, the lock is released when the brake pedal 18 is operated after the shift operation member 14 is not operated. In other words, the driver can hardly release the lock unless releasing the force for turning the shift operation member 14 in the CW direction and then operating the brake pedal 18.

Therefore, the shift apparatus 10 mitigates a condition for locking the shift operation member 14 within a predetermined time after the shift range is switched to the P range. Specifically, within the predetermined time, the driver releases the lock of the shift operation member 14 when operating the brake pedal 18 after rotating the shift operation member 14 in the CW direction to be in the P range. Thus, it is possible to improve the operability of the driver while preventing an unintended sudden acceleration from the P range.

4. State Transition of Shift Apparatus

Figure 6:
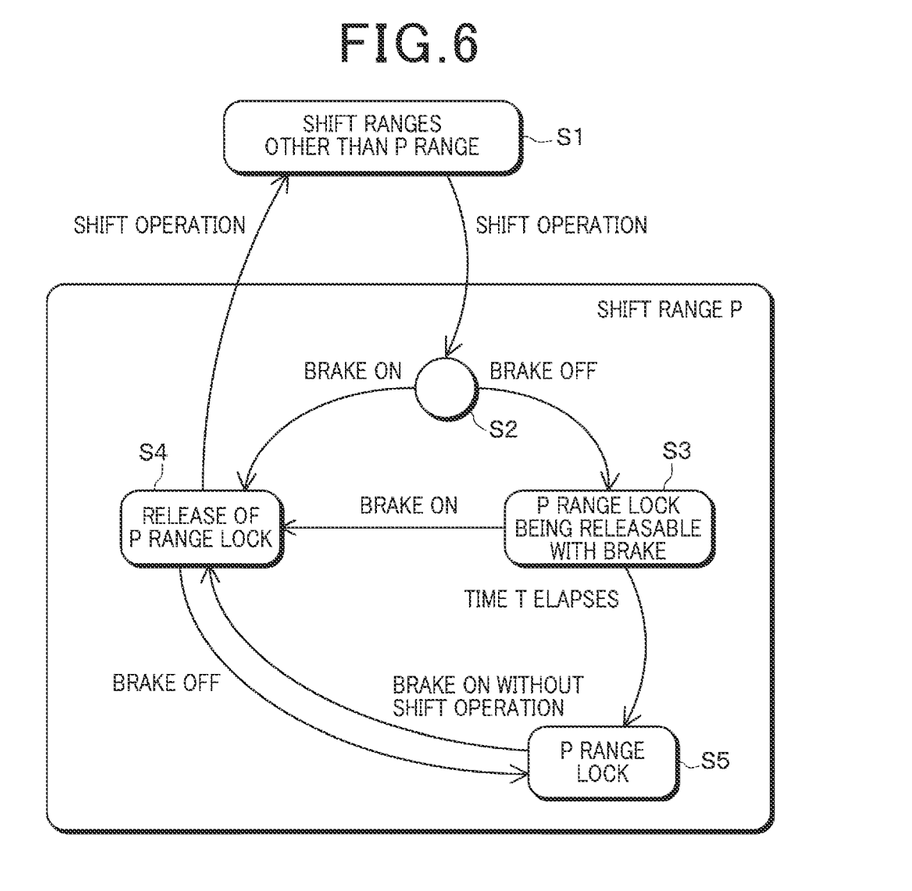
FIG. 6 is a state transition diagram of the automobile related to a shift operation.

FIG. 6 is a state transition diagram of the automobile 1 related to the shift operation, and shows a state transition of the shift apparatus 10 regarding the switching of the shift range between the shift range other than the P range and the P range.

In FIG. 6, a state S1 defines a state in which the shift range other than the P range is selected. The state S1 may be any one of the S range, the D range, the N range, and the R range. In other words, the shift operation member 14 is at any of the selection positions P2 to P5 in the state S1.

In the state S1, when the shift operation member 14 rotates to the selection position P1 by the operation of the driver, the shift apparatus 10 transitions to a state S2. In the state S2, it is determined whether the brake pedal 18 is operated (brake ON) or not operated (brake OFF).

In the state S2, when the brake is turned ON, the shift apparatus 10 transitions to a state S4. The state S4 is a state in which the electromagnetic brake mechanism 50 is off and the shift operation member 14 is not locked. In the state S4, the shift operation member 14 can be operated. When the shift operation member 14 is operated, the shift range can be switched to the shift range other than the P range and the shift apparatus 10 transitions to the state S1.

When the brake is turned OFF in the state S4, the shift apparatus 10 transitions to a state S5 which will be described below.

When the brake is turned OFF in the state S2, the shift apparatus 10 transitions to a state S3. The state S3 is a state in which the shift operation member 14 is locked and the lock can be released on condition that the brake is turned ON. In the state S3, for example, the lock is released when the brake is turned ON in a state in which the driver applies a force in the CW direction to rotate the shift operation member 14.

As described with reference to FIG. 4, even when the electromagnetic brake mechanism 50 locks the shift operation member 14, the shift operation member 14 slightly moves from the selection position P1 to the selection position P2 side when the driver applies a force to the shift operation member 14. The rotating amount of the shift operation member 14 in this case is smaller than, for example, the rotating amount between the selection position P1 and the selection position P2, but can be detected by the angle detector 31. Further, when the operating force is released, the shift operation member 14 returns to the position before rotation due to the action of the operation load generator 44. Accordingly, the control unit 11 can determine, based on the detection result of the angle detector 31, whether the drives applies a force to the shift operation member 14 in the state where the shift operation member 14 is locked, and whether the operating force is released.

When it is determined, based on the detection result of the angle detector 31 in the states S3 and S5, that the shift operation member 14 rotates from the selection position P1, the lock control section 114 starts applying a current to the coil 52 and causes the electromagnetic brake mechanism 50 to lock. When it is determined, based on the detection result of the angle detector 31 that the shift operation member 14 has returned to the selection position P1 during the current application to the coil 52, the lock control section 114 stops the current application to the coil 52. By such control, the lock control section 114 does not need to apply the current to the electromagnetic brake mechanism 50 at all times in the states S3 and S5.

In the S3, the shift apparatus 10 monitors an elapsed time from the transition from the stat S1 to the state S2. The shift apparatus 10 transitions to the state S5 when the elapsed time is equal to or longer than a time T. The time T is a preset time, and corresponds to the predetermined time described above. The state S5 is a state in which the shift operation member 14 is locked as in the state S3. In the state S5, when the brake is turned ON in the case where the shift operation member 14 is not operated, the shift apparatus transitions to the state S4 and the lock is released. In the state S5, when the shift operation member 14 is being operated, the lock is not released even when the brake is turned ON.

Further, although not shown in FIG. 6, the shift operation determination unit 110 refers to the detection result of the accelerator operation detection section 111 and the detection result of the obstacle detection section 115 during the transition from the state S3 to the state S4. The shift apparatus 10 cancels the transition from the state S3 to the state S4 and maintains the state S3 when the accelerator pedal 17 is being operated and an obstacle is detected by the obstacle sensor 36.

5. Operation of Shift Apparatus

Figure 7:
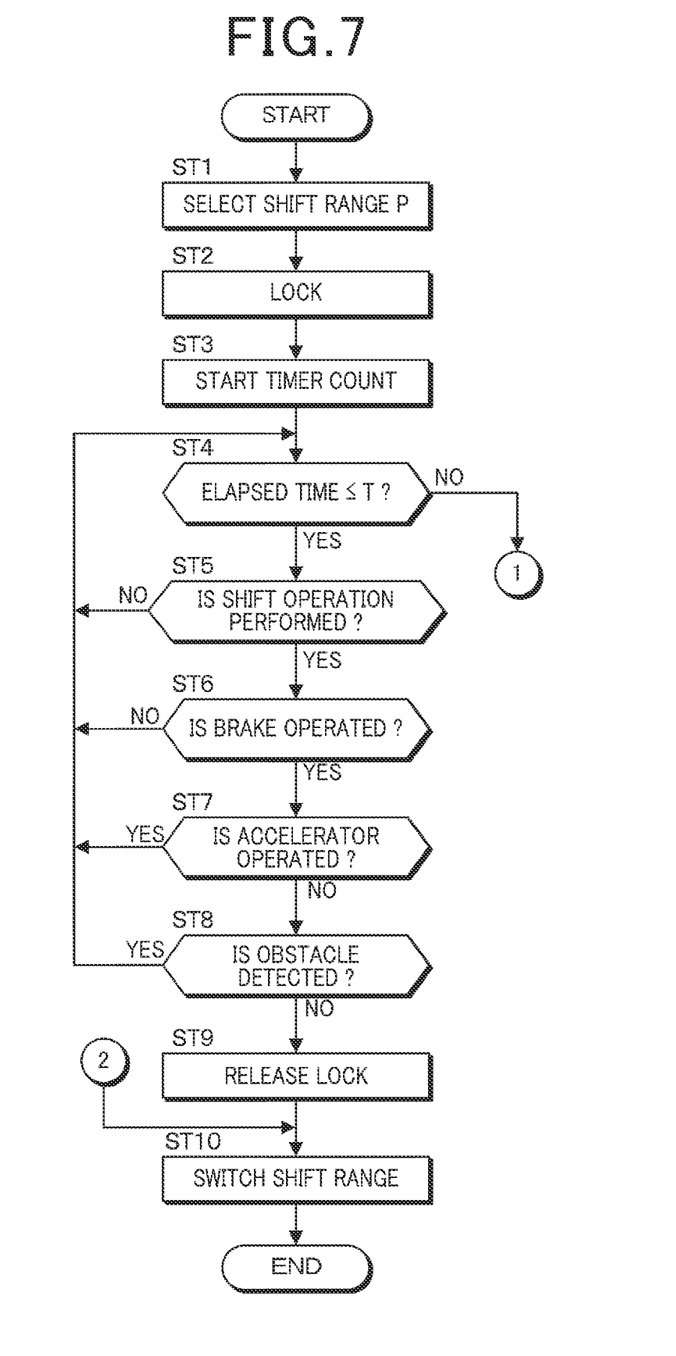
FIG. 7 is a flowchart showing an operation of the control unit.
Figure 8:
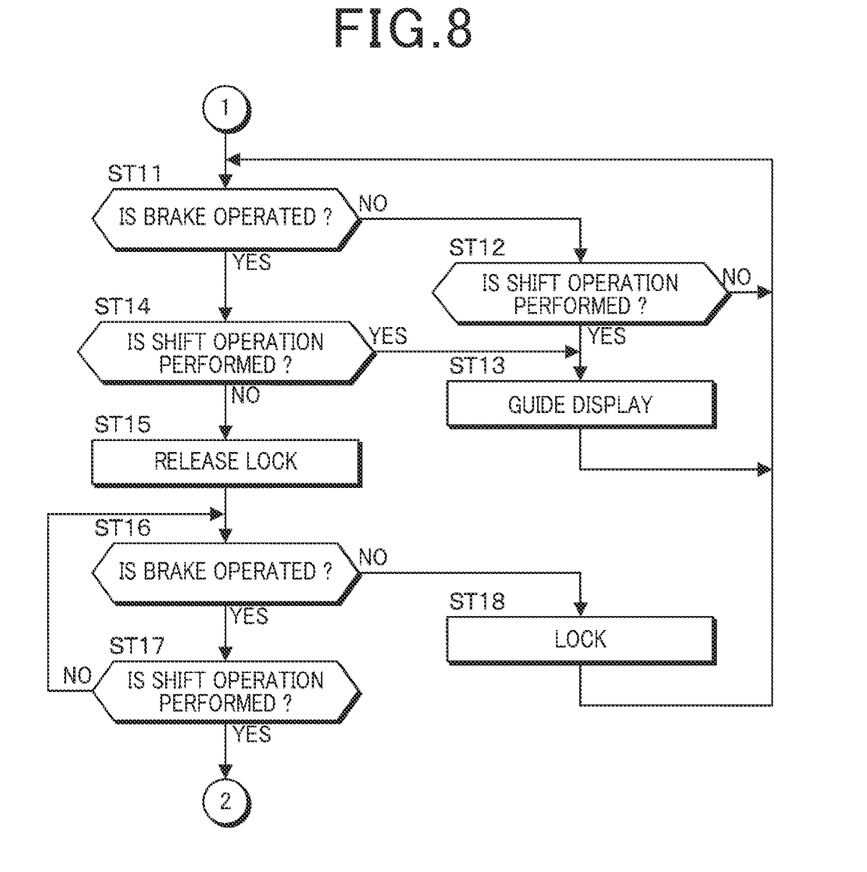
FIG. 8 is a flowchart showing an operation of the control unit.

An operation of the shift apparatus 10 will be described with reference to a flow chart. FIGS. 7 and 8 are flowcharts showing an operation of the control unit 11, and are examples of realizing the state transition shown in FIG. 6. The operations of FIGS. 7 and 8 are executed by the shift operation determination unit 110. Specifically, operations of steps ST1 and ST10 are executed by the shift determination section 113, and other operations are executed by the lock control section 114.

The shift operation determination unit 110 selects the shift range according to the operation of the shift operation member 14. The shift operation determination unit 110 notifies the shift control section 103 of the selected shift range, and the shift control section 103 switches the shift range of the transmission 4 to the selected shift range. The operation of FIG. 7 is started when the shift operation determination unit 110 selects the P range (step ST1). In step ST1, the shift apparatus 10 transitions to the state S3 (see FIG. 6).

The shift operation determination unit 110 locks the shift operation member 14 by the electromagnetic brake mechanism 50 (step ST2), and starts counting a time with a timer (step ST3). In step ST3, a counting of an elapsed time from the transition of the shift apparatus 10 to the state S3 is started.

The shift operation determination unit 110 determines whether the elapsed time being counted is equal to or shorter than the preset time T (step ST4). In step ST4, when the elapsed time is equal to or shorter than the time T (YES in step ST4), the shift operation determination unit 110 maintains the state S3. In this case, the shift operation determination unit 110 determines, based on the detection result of the angle detector 31, whether the shift operation member 14 is being operated (step ST5).

When the shift operation member 14 is not being operated (NO in step ST5), the shift operation determination unit 110 returns to step ST4. When the shift operation member 14 is being operated (YES in step ST5), the shift operation determination unit 110 determines whether the brake pedal 18 is being operated (step ST6).

When the brake pedal 18 is being operated (YES in step ST6), the shift operation determination unit 110 determines whether the accelerator pedal 17 is being operated (step ST7). When the accelerator pedal 17 is not being operated (NO in step ST7), the shift operation determination unit 110 determines whether an obstacle is detected by the obstacle sensor 36 (step ST8).

The shift operation determination unit 110 returns to step ST4 without releasing the lock of the shift operation member 14 when the brake pedal 18 is not being operated (NO in step ST6), the accelerator pedal 17 is being operated (YES in step ST7), and the obstacle is being detected by the obstacle sensor 36 (YES in step ST8).

In step ST8, when the obstacle is not being detected by the obstacle sensor 36 (NO in step ST8), the shift operation determination unit 110 transitions to the state S4 and releases the lock of the shift operation member 14 (step ST9). The shift operation determination unit 110 selects the shift range according to the operation of the shift operation member 14, notifies the shift control section 103 of the selected shift range, and switches the shift range (step ST10). Thus, the shift operation determination unit 110 transitions to the state S1.

In this way, the shift operation member 14 is locked until the time T elapses from the time when the shift range is switched to the P range, while the release of the lock is permitted after the shift operation member 14 is operated. For this reason, the driver can quickly switch from the P range to another shift range. Further, as a condition for releasing the lock, the brake pedal 18 needs to be operated, the driver does not unintentionally switch the shift range to the shift range other than the P range, and the automobile 1 can be started according to the driver's intention. Further, as a condition for releasing the lock, it is necessary that the accelerator pedal 17 is not operated, and the shift range can be switched in a more stable state. Furthermore, as a condition for releasing the lock, it is necessary that the obstacle sensor 36 does not detect any obstacle, and the shift range can be switched after the surrounding situations are appropriately confirmed.

When the counting of the elapsed time after the shift range is switched to the P range exceeds the time T (NO in step ST4), the shift operation determination unit 110 transitions form the state S3 to the state S5. The shift operation determination unit 110 determines whether the brake pedal 18 is being operated (step ST11).

When the brake pedal 18 is not being operated (NO in step ST11), the shift operation determination unit 110 determines whether the shift operation member 14 is being operated (step ST12). When the shift operation member 14 is not being operated (NO in step ST12), the shift operation determination unit 110 returns to step ST11.

When the shift operation member 14 is being operated (YES in step ST12), the shift operation determination unit 110 controls the meter panel 12 to display characters, images and messages or to light up a warning light, and guides the driver to release the operation of the shift operation member 14 (step ST13). Thereafter, the shift operation determination unit 110 returns to step ST11.

When the brake pedal 18 is being operated (YES in step ST11), the shift operation determination unit 110 determines whether the shift operation member 14 is being operated (step ST14). When the shift operation member 14 is being operated (YES in step ST14), the shift operation determination unit 110 transitions to step ST13 and guides the driver.

When the shift operation member 14 is not being operated (NO in step ST14), the shift operation determination unit 110 transitions to the state S4, and releases the lock of the shift operation member 14 (step ST15). Subsequently, the shift operation determination unit 110 determines whether the brake pedal 18 is being operated (step ST16). When the brake pedal 18 is not being operated (NO in step ST16), the shift operation determination unit 110 locks the shift operation member (step ST18), and returns to step ST11.

On the other hand, when the brake pedal 18 is being operated (YES in step ST16), the shift operation determination unit 110 determines whether the shift operation member 14 is being operated (step ST17). When the shift operation member 14 is not being operated (NO in step ST17), the shift operation determination unit 110 returns to step ST16.

When the shift operation member 14 is being operated (YES in step ST17), the shift operation determination unit 110 transitions to step ST10, selects the shift range according to the operation of the shift operation member 14, and notifies the shift control section 103 of the selected shift range, thereby switching the shift range (step ST10). Thus, the shift operation determination unit 110 transitions to the state S1.

6. Summary

As described above, the shift apparatus 10 according to the embodiment of the present invention includes: the shift operation member 14 rotatably attached to the automobile 1; the angle detector 31 configured to detect the position of the shift operation member 14 in the rotation direction; the electromagnetic brake mechanism 50 configured to regulate the rotation of the shift operation member 14; the brake operation detection section 112 configured to detect the operation of the brake pedal 18; the shift determination section 113 configured to determine any one of the plurality of shift ranges including the first range (P range) for parking and a second range (for example, an R range) different from the first range, based on the position of the shift operation member 14; and the lock control section 114 configured to cause the electromagnetic brake mechanism 50 to regulate the rotation of the shift operation member 14 from the first position (selection position P1) corresponding to the first range to the second position (for example, selection position P2) corresponding to the second range when the operation of the brake pedal 18 is not detected, wherein the lock control section 114 is capable of releasing the regulation of the rotation of the shift operation member 14 from the first position to the second position within the predetermined time after the shift operation member 14 rotates from the second position to the first position.

According to such a configuration, the regulation of the switching operation from the P range to another shift range can be released within a predetermined time after the P range for parking is selected. Thus, the burden of the operation of changing the shift range from the P range can be reduced, and the operability of the automobile 1 can be improved. For example, when the driver unintentionally selects the P range, the P range can be easily switched to the originally intended shift range.

Within the predetermined time after the shift operation member 14 rotates from the second position to the first position, the lock control section 114 releases the regulation of the rotation of the shift operation member 14 when the operation of the brake pedal 18 is detected. Thus, the lock can be released on condition that the brake pedal 18 is operated in the state where the shift operation member 14 is locked. For this reason, the driver can easily release the lock of the shift operation member 14 while maintaining a configuration in which the unintended shift switching from the P range to another shift range can be reliably prevented, and the operability can be further improved.

The lock control section 114 causes the electromagnetic brake mechanism 50 to regulate the rotation of the shift operation member 14 when the shift operation member 14 moves to the second position side of the first position in the state where the brake pedal 18 is not operated. In addition, within the predetermined time after the shift operation member 14 rotates from the second position to the first position, the lock control section 114 release the regulation of the rotation of the shift operation member 14 when the operation of the brake pedal 18 is detected in the state where the shift operation member 14 moves to the second position side of the first position. Thus, the operation of the shift operation member 14 can be efficiently and reliably locked by the electromagnetic brake mechanism 50. Further, in the P range, the shift operation member 14 is locked and the lock is released according to the operation of the brake pedal 18 within the predetermined time, so that the driver can easily release the lock of the shift operation member 14, and the operability can be further improved.

The lock control section 114 releases the regulation by the electromagnetic brake mechanism 50 on condition that both the release of the operation of rotating the shift operation member 14 and the operation of the brake pedal 18 are performed, when the electromagnetic brake mechanism 50 regulates the rotation of the shift operation member 14 due to the movement of the shift operation member 14 to the second position side of the first position in the state where the brake pedal 18 is not operated. Further, within the predetermined time after the shift operation member 14 rotates from the second position to the first position, the lock control section 114 releases the regulation of the rotation of the shift operation member 14 when the operation of the brake pedal 18 is detected in the state where the shift operation member 14 moves to the second position side of the first position. Therefore, the driver can easily release the lock of the shift operation member 14 while maintaining a configuration in which the unintended shift switching from the P range to another shift range can be reliably prevented, and the operability can be further improved.

The shift operation determination unit 110 further includes an accelerator operation detection section 111 configured to detect an operation on the accelerator pedal 17 of the automobile 1. The lock control section 114 causes the electromagnetic brake mechanism 50 to regulate the rotation of the shift operation member 14 until the operation on the accelerator pedal 17 is released for a predetermined time after the shift operation member 14 rotates from the second position to the first position when the accelerator pedal 17 is operated. According to such a configuration, it is necessary that the accelerator pedal 17 is not operated as a condition for releasing the lock of the shift operation member 14 and enabling the shift range to be changed from the P range, so that the shift range can be switched from the P range in a more stable state.

The shift operation determination unit further includes the obstacle sensor 36 configured to detect the obstacle around the automobile 1, and the lock control section 114 causes electromagnetic brake mechanism 50 to regulate the rotation of the shift operation member 14 when the obstacle is detected by the obstacle sensor 36 for the predetermined time after the shift operation member 14 rotates from the second position to the first position. According to such a configuration, it is necessary that the obstacle sensor 36 does not detect any obstacle as a condition for releasing the lock of the shift operation member 14 and enabling the shift range to be changed from the P range. Therefore, it is possible to ensure that the surrounding situations are appropriate when the shift range can be switched from the P range.

7. Other Embodiments

The present invention is not limited to the configuration of the above-described embodiment, and can be implemented in various aspects without departing from the gist thereof.

For example, the operation unit 25 is not limited to the configuration shown in FIG. 4. The configuration of the angle detector 31 may be a rotary encoder or an optical sensor that detects the amount of rotation of the gear 43 or the shaft 14a of the shift operation member 14, or a detector having a gear that meshes with the gear 43. Alternatively, a detector may be used to magnetically detect a position of a magnetic body attached to the shift operation member 14. Further, the configuration for locking the rotation of the shift operation member 14 is not limited to the electromagnetic brake mechanism 50, and, for example, a pin that is fitted to the overdrive mechanism 46 to prevent the rotation of the overdrive mechanism 46 and an actuator that moves the pin. Alternatively, a motor may be used to apply a rotational force to the shift operation member 14 in a direction opposite to the operated direction.

In the above-described embodiment, the shift operation member 14 having the dial shape is illustrated, but the present invention is not limited thereto. The operation member may have a lever shape or the like as long as being rotatably installed on the automobile 1 and being rotated by the driver to perform the operation.

In the above-described embodiment, the control unit 11 includes the shift operation determination unit 110 together with the ECU 101, but the shift operation determination unit 110 may be configured independently of the ECU 101.

The present invention is applicable not only to the automobile 1 shown in FIG. 1, but also to all vehicles to be driven by an automatic transmission, for example, a freight vehicle, a large automobile, and a three-wheeled automobile.

The hardware configuration of the apparatus according to the present invention is not limited to the example of FIG. 5. Further, FIGS. 7 and 8 show the operation example in which the process procedure is divided into each step of the flowchart for convenience, and the operation of the apparatus according to the present invention is not limited to the order shown in FIGS. 7 and 8.

REFERENCE SIGNS LIST

1 automobile (vehicle)
2 engine
3 motor generator
4 transmission
5 drive shaft
6 wheel
10 shift apparatus (shift operation determination apparatus)
11 control unit
12 meter panel 13 steering wheel
14 shift operation member (operation member)
17 accelerator pedal (accelerator operation section)
18 brake pedal
19 instrument panel
22 range display portion
23, 23a, 23b, 23c, 23d, 23e indicator
25 operation unit
31 angle detector (operation detection section)
32 vehicle speed sensor
33 accelerator pedal sensor
34 brake pedal sensor
36 obstacle sensor
41 case
44 operation load generator
46 overdrive mechanism
50 electromagnetic brake mechanism (lock mechanism)
101 ECU
103 shift control section
105 interface
110 shift operation determination unit
111 accelerator operation detection section (acceleration operation detection section)
112 brake operation detection section (braking operation detection section)
113 shift determination section
114 lock control section
115 obstacle detection section

What is claimed is:

1. A shift operation determination apparatus comprising:
an operation member rotatably attached to a vehicle;
an operation detection section configured to detect a position of the operation member in a rotation direction;
a lock mechanism configured to regulate a rotation of the operation member;
a braking operation detection section configured to detect a braking operation of the vehicle;
a shift determination section configured to determine any one of a plurality of shift ranges including a first range for parking and a second range different from the first range, based on the position of the operation member; and
a lock control section configured to cause the lock mechanism to regulate the rotation of the operation member from a first position corresponding to the first range to a second position corresponding to the second range when the braking operation is not detected, wherein
the lock control section is capable of releasing a regulation of the rotation of the operation member from the first position to the second position within a predetermined time after the operation member rotates from the second position to the first position.

2. The shift operation determination apparatus according to claim 1, wherein
the lock control section releases the regulation of the rotation of the operation member when the braking operation is detected, within the predetermined time after the operation member rotates from the second position to the first position.

3. The shift operation determination apparatus according to claim 2, wherein
the lock control section causes the lock mechanism to regulate the rotation of the operation member when the operation member moves to the second position side of the first position in an absence of the braking operation, and
the lock control section releases the regulation of the rotation of the operation member when the braking operation is detected in the state where the operation member moves to the second position side of the first position, within the predetermined time after the operation member rotates from the second position to the first position.

4. The shift operation determination apparatus according to claim 3, wherein
the lock control section releases the regulation by the lock mechanism on condition that both the release of the operation of rotating the operation member and the braking operation are performed, when the rotation of the operation member is regulated by the lock mechanism due to movement of the operation member to the second position side of the first position in the absence of the braking operation, and
the lock control section releases the regulation of the rotation of the operation member when the braking operation is detected in the state where the operation member moves to the second position side of the first position, within the predetermined time after the operation member rotates from the second position to the first position.

5. The shift operation determination apparatus according to claim 1, further comprising:
an acceleration operation detection section configured to detect an operation on an accelerator operation section of the vehicle, wherein
the lock control section causes the lock mechanism to regulate the rotation of the operation member until the operation on the accelerator operation section is released when the operation is performed on the accelerator operation section for the predetermined time after the operation member rotates from the second position to the first position.

6. The shift operation determination apparatus according to claim 1, further comprising:
an obstacle detection section configured to detect an obstacle around the vehicle, wherein
the lock control section causes the lock mechanism to regulate the rotation of the operation member while the obstacle is detected by the obstacle detection section for the predetermined time after the operation member rotates from the second position to the first position.

7. A shift apparatus comprising:
a shift operation determination apparatus configured to determine a shift range of a vehicle according to an operation; and
a shift control section configured to switch the shift range of the vehicle based on a determination result of the shift operation determination apparatus,
the shift operation determination apparatus including:
an operation member rotatably attached to the vehicle;
an operation detection section configured to detect a position of the operation member in a rotation direction;
a lock mechanism configured to regulate a rotation of the operation member;
a braking operation detection section configured to detect a braking operation of the vehicle;
a shift determination section configured to determine any one of a plurality of shift ranges including a first range for parking and a second range different from the first range, based on the position of the operation member; and a lock control section configured to cause the lock mechanism to regulate the rotation of the operation member from a first position corresponding to the first range to a second position corresponding to the second range when the braking operation is not detected,
the lock control section being capable of releasing a regulation of the rotation of the operation member from the first position to the second position within a predetermined time after the operation member rotates from the second position to the first position.

* * * * *